Patented Apr. 12, 1932

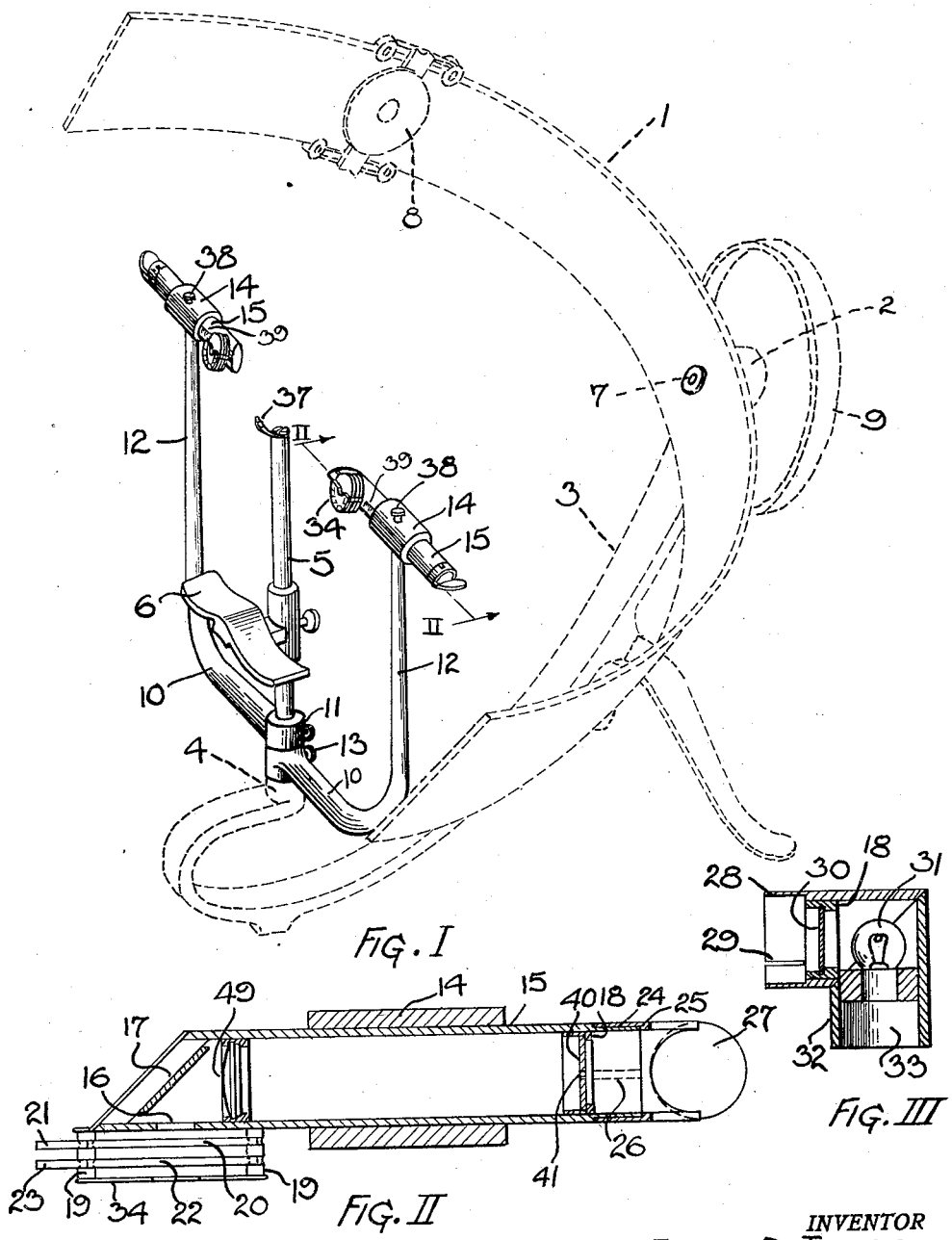

1,853,710

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

EYE TESTING INSTRUMENT

Application filed January 13, 1930. Serial No. 420,408.

This invention relates to improvements in eye-testing instruments and has particular reference to improved means of binocularly fixing a patient's eyes while testing the field and observing the condition thereof.

The principal object of this invention is to provide binocular fixation for an eye-testing instrument which will be simple in manipulation and accurate in operation rendering expensive mechanism unnecessary.

Another object of the invention is to provide a fixation spot for the eye not under test which will not require extraneous illumination to be distinctly visible under all conditions.

Another object of the invention is to provide means to correct the vision of the eye under test to facilitate fixation.

Another object of the invention is to provide an economical binocular fixation unit for existing instruments wherein usual optical equipment may be utilized.

Other objects and advantages will become apparent from the following description taken in connection with the accompanying drawings and it will be apparent that many changes may be made in the details of construction and arrangement of parts without departing from the spirit of the invention as expressed in the accompanying claims. I, therefore, do not wish to be limited to the exact details shown and described as the preferred forms only have been shown by way of illustration.

In the drawings:

Fig. I is a perspective view showing the fixation unit applied to an eye-testing instrument.

Fig. II is a longitudinal section on line II—II of Fig. I.

Fig. III is a sectional view showing a modified form of target.

Improvements have been made in eye-testing instruments, such as perimeters, which utilize the binocular vision of a patient's eyes to improve the accuracy of the test being conducted. This is known as "binocular fixation" as both eyes are held in desired position by being fixed upon separate objects and in the case of the eye not under test these objects are made to appear superimposed. It has heretofore been necessary to have an elaborate and expensive system of rotating reflectors and targets which had to be moved back and forth and angled one with the other in order to obtain binocular fixation.

In my invention I have provided means whereby the expensive mechanism heretofore associated with binocular fixation perimetry may be eliminated and the practitioner may utilize ordinary lenses from his trial case to obtain all the advantages of the prior types with far less expense and trouble.

Together with this reduction in the amount of apparatus necessary I have devised means whereby the binocular fixation unit may be applied to existing perimeters at a minimum of cost as compared with the necessity of purchasing an entirely new instrument embodying this principle.

Referring to the drawings wherein similar characters of reference denote corresponding parts throughout the several views I have illustrated in dotted lines in Fig. I a usual type of perimeter to which the invention may be applied.

This particular instrument comprises an arcuate arm 1 pivoted at 2 to a support 3. The support 3 is curved to clear the arm 1 which swings on the pivot 2 and has a locating hole 4 at its forward end into which is held an upright 5 carrying a chin-rest 6. At the upper end of the upright 5 is placed an eye-sighting point 37 located approximately at the center of the curve of the arm 1 so that the rotation of said arc will not change the relative position of the eye to the arc.

A fixation spot 7 is placed on the arc 1 at a point in line with the axis of its pivot to provide means upon which the patient may fix the eye being tested. A test object 8 is slidably mounted on the arm 1 and movable therearound to test the field of the eye. The test object may be mounted on the end of a rod held in the hand of the operator if desired. A suitable chart holder 9 is mounted on the rear of the arm 1 at the pivot 2.

My improved binocular fixation device is applied to the instrument in a simple manner as will now be apparent.

A pair of arms 10 separately slidable on upright 5 having upwardly extending arms 12 are slid over the upright 5 and locked thereon by the screw 13 after which the chin-rest 6 and eye-sighting point 37 may be locked in desired position on the upright 5.

It will be apparent that this device may be adapted to existing perimeters with great ease. The actual improvements in the device itself rendering it simple in operation and accurate in use will be apparent from the following description of its construction and operation.

At the top of each upwardly extending arm 12 of the members 10 I provide a hollow boss 14 carrying a tubular member 15 slidable therein preferably normal to the upward extending arms 12.

In the side of the tube 15 adjacent the chinrest 6 I provide an aperture 16 through which the patient may observe a reflector 17 positioned preferably at an angle to the axis of the tube 15 in the interior thereof. At the other end of the tube 15, I provide a collar 18 in which is held a test object 40 having a pin hole 41 or other shape of aperture therein. The end of the tubular member 15 behind the collar 18 is preferably reduced with a neck portion 24 over which is a spring collar 25 preferably having slots 26 to lend resilience enough to spring it over the neck 24. At the other end of the spring collar 25 opposite the slots 26 I place an inclined reflector 27. Light impinging thereon will be reflected on the test object 40.

One of the novel features of the invention is now apparent inasmuch as the reflector 27 provides illumination for the test object 40 through the pin hole 41. This is accomplished as follows: The eye not under test will look through the aperture 16 and see in the reflector 17 the image of the test object 40 with the pin hole 41 made visible by the reflector 27 behind. It will be apparent that the reflector 27 to improve its surface may be coated with white paint or enamel or other suitable surface and that the aperture in the object 40 may be of any size or shape. The spring collar 25 may be rotated on the neck 24 in order that the reflector 27 may obtain the best available illumination.

Intermediate the reflector 17 and collar 18 is a lens 49 adapted to project the object 40 to infinity. In order that different patients may see the reflected image with equal clearness I have provided lens holding means aligned with the aperture 16 and preferably consisting of grooved rods 19 extending from the tube 15 which are adapted to accommodate a correcting lens 20.

The correcting lens 20 may be of the usual type found in any trial lens case and have a handle 21 with which in the case of a cylinder lens it may be rotated to position the axis in the desired meridian. It will be apparent that a desired amount of correction may be given before the patient's eye by merely inserting a chosen lens 20 in the holder and all patients will see the reflected image with equal clearness.

One of the important features of the instrument is the binocular fixation in which the patient has the eye under test fixed on the central fixation spot 7 and the eye not under test is fixed on the reflected image in the reflector 17 of the fixation object. To prevent the eye not under test from roving during the test the two objects should be superimposed to give the effect of binocular vision of one object. The binocular fixation principle is based upon this and the object is to superimpose the spot 7 and object 40 to fix the eye not under test more precisely.

In my invention I accomplish this superimposing by means of a prism lens 22 which is placed in the grooved rods 19 between the eye not under test and the reflector 17. By rotating the prism by means of a suitable handle 23 the image of the object 40 and fixation spot 7 are superimposed and the eye not under test thereby more readily held in position. It will readily be seen that by means of a simple prism lens I have accomplished the result previously attainable only by means of elaborate mechanism. If desired I can omit the prism lens 22 and by rotating the tube 15 on its axis in the bearing 38 and swinging the arm 12 on the upright 5 obtain an effective prism displacement by which the fixation object 40 for the eye not under test can be superimposed on the fixation object 7 of the eye under test. Either arm 12 may, of course, be swung completely out of the way if desired while the other arm is being used.

A graduated scale 34 is attached to the rods 19 and may be used to indicate the base axis of the prism lens 22 and the axis of the cylinder lens 20 if such a type is used instead of a spherical or other correcting lens.

In the use of a modified form of the invention shown in Fig. III the spring collar 25 previously described may be removed and the modified form placed on the neck 24 of the tube 15. The modified form comprises a spring collar 28 with slots 29 to spring over the neck portion 24 and has a ground glass screen 30 in the collar 18 behind which is a lamp, 31. The lamp 31 itself may be of diffusing type and the screen omitted if desired. A tubular portion 32 preferably normal to the collar 28 carries a socket 33 for said lamp 31 which may be connected to a suitable source of current. By this device the inclined reflector or fixation object 27 may be omitted and a constant degree of illumination for the fixation spot 30 in the collar 18 be acquired.

In the operation of the device the position of the patient's head is fixed by placing his chin on the chinrest 6. According to which eye is being tested either half of the chinrest is used and the eye under test aligned with the eye sighting point 37 and fixation spot 7. The eye not under test is aligned with the aperture 16 in the tube 15 by sliding the tube through the boss 17 after which it may be locked in position by the screw 38. A scale 39 to indicate the patient's pupillary distance may be marked on the tube 15.

The eye not under test will see the projected image of the pin hole or fixation object 40 in the reflector 17 and a correcting lens 20 may be put in the rods 19 to suit the patient's vision.

The prism lens 22 is then rotated; or the tube 15 on its axis and arm 12 rotated at 11 to superimpose the image of the object 40 in the eye not under test with the central fixation spot 7 of the eye under test; then object 8 is moved along arm 1 as in usual perimetry tests.

It will be apparent that instead of using a reflector 17 I can use a prism which may either totally reflect or else be designed to refract and so enable the eye at the aperture 16 to view the object 40.

It will be apparent that the operation of the device is of a simple and efficient nature and that either eye may be tested by merely shifting the patient's chin to the other half of the chin rest and aligning the other eye with the aperture 16.

From the foregoing it will readily be seen that an economical device has been provided to accomplish accurate fixation of a patient's eyes and that simple means have been provided to attach the device to existing instruments. All angling and maneuvering of the reflector and fixation spot for the eye not under test has been eliminated and also extraneous forms of illumination for the fixation spot itself.

Having described my invention, I claim:

1. In a device of the character described, a fixation object for the eye under test, a fixation object for an eye not under test, means aligned with the fixation object of the eye not under test to afford vision thereof and correct slight visual errors, and a rotatable prism lens aligned with the eye not under test and the vision affording means to position said fixation object in superimposed relation with the fixation object of the eye under test to provide binocular fixation.

2. In a device of the character described, a fixation object for an eye not under test, a reflector aligned with the fixation object to reflect the image thereof into the eye not under test, a rotatable prism lens between the eye not under test and the reflector to move said image to desired position in said reflector and a correcting lens adjacent the prism and between the reflector and eye not under test to correct the optical errors of said eye and afford clear vision of said image in the reflector.

3. In a device of the character described, a fixation object for an eye not under test, a reflector aligned with the fixation object to reflect the image thereof to be seen by the eye not under test, a lens between the fixation object and the reflector to clearly focus said image in the reflector to the required effective distance from the eye, lens means between the eye not under test and the reflector to move said image to desired position in said reflector and a correcting lens adjacent the lens means to correct the optical errors of said eye and afford clear vision of said image in the reflector.

4. In a device of the character described, a fixation object for an eye not under test normally out of the direct vision of said eye, a reflector aligned with the fixation object to reflect the image thereof to be seen by the eye not under test, a lens between the fixation object and the reflector to focus said image in the reflector to the required effective distance from the eye, a rotatable prism lens between the eye not under test and the reflector to move said image to desired position in said reflector and a correcting lens adjacent the prism and in the line of vision of the eye to correct the optical errors of said eye and afford clear vision of said image in the reflector.

5. In a device of the character described, a fixation spot for an eye not under test comprising a member having a perforation, an inclined light deflecting member aligned with said perforated member, a reflector to permit vision of the inclined light deflecting member through the perforation, and lens means to optically move the perforated member to bring it distinctly before the eye in the reflector.

6. In a device of the character described, a fixation spot for an eye not under test comprising a member having a perforation, light diffusing means over said perforation, an illuminating member adapted to shine through said diffusing means, a lens aligned with the illuminating member to optically move said perforated member to required distance from the eye, a reflector adjacent said lens upon which the image of the member is visible, means to move the image to desired position in the reflector, and means between the reflector and eye not under test to correct the optical errors of said eye to afford clear vision of the object in the reflector.

7. In a device of the character described, a fixation object for an eye under test, a fixation object for an eye not under test and normally positioned out of the direct field of vision of said eye, means aligned with the fixation object of the eye not under test to afford vision of said object and confine the vision of the eye not under test to that of the object, lens means between the fixation object and the eye not under test for correcting the focal errors of said eye to prevent movement of said eye to establish a proper focus and means between the said fixation object and the eye not under test for effectively positioning the said fixation object at the required distance from said eye.

8. In a device of the character described, a fixation object for an eye under test, a fixation object for an eye not under test and normally positioned out of the direct field of vision of said eye, light deflecting or reflecting means aligned with the fixation object of the eye not under test to afford vision of said object and confine the vision of the eye not under test to that of the object, means between the fixation object of the eye not under test and the eye not under test for focusing the eye to prevent movement thereof to establish clear vision and lens means between the said fixation object at the required distance from said eye.

9. In a device of the character described, a fixation object for an eye under test, a fixation object for an eye not under test and normally positioned out of the direct field of vision of said eye, means aligned with the fixation object of the eye not under test to afford vision of said object and confine the vision of the eye not under test to that of the object, means between the fixation object of the eye not under test and the eye not under test for focusing said eye to prevent movement thereof in an endeavor to establish clear vision, means between the said fixation object and the eye not under test for effectively positioning the said fixation object at the required distance from said eye and operable prism means between the said test object and the eye not under test for effectively positioning the fixation object of the eye not under test in superimposed relation with the fixation object of the eye under test.

EDGAR D. TILLYER.